United States Patent [19]

Josis

[11] 4,104,038

[45] Aug. 1, 1978

[54] DESORPTION OF VOLATILE COMPOUNDS DISSOLVED IN A LIQUID PHASE

[75] Inventor: Christian Rubens Josis, Gembloux, Belgium

[73] Assignee: Centre de Recherches Metallurgiques-Centrum voor Research in de Metallurgie, Brussels, Belgium

[21] Appl. No.: 696,175

[22] Filed: Jun. 15, 1976

[30] Foreign Application Priority Data

Jun. 24, 1975 [BE] Belgium .................. 830595

[51] Int. Cl.$^2$ ............................................. B01D 19/00
[52] U.S. Cl. ........................................ 55/19; 55/46; 55/53; 55/70; 55/160
[58] Field of Search .................. 55/46, 19, 20, 52, 53, 55/70, 160, 196, 202; 423/356

[56] References Cited

U.S. PATENT DOCUMENTS

| 3,292,345 | 12/1966 | Wunderlich et al. | 55/46 |
| 3,540,189 | 11/1970 | Siewers et al. | 55/70 X |
| 3,785,121 | 1/1974 | Phelps | 55/70 X |
| 3,920,419 | 11/1975 | Schroeder et al. | 55/70 |
| 3,972,693 | 8/1976 | Wiesner et al. | 55/70 X |

*Primary Examiner*—Frank A. Spear, Jr.
*Assistant Examiner*—Richard W. Burks
*Attorney, Agent, or Firm*—Holman & Stern

[57] ABSTRACT

Volatile compounds are desorbed from an aqueous liquid containing ammonia, by means of a stripping column. The aqueous liquid is supplied to the upper part of the column and a gaseous mixture including free oxygen is blown into the lower part of the column. Sodium hydroxide and/or calcium hydroxide is supplied to an intermediate part of the column at a plurality of levels. A gaseous mixture including ammonia is withdrawn from the top of the column. The pH and the temperature of the aqueous liquid are measured at a plurality of levels in the column. The flow rate of the aqueous liquid and the flow rate and temperature of the gaseous mixture blown in and of the hydroxide are controlled so that the pH of the aqueous liquid, at least in a predetermined zone of the column, is at least 11.

6 Claims, 2 Drawing Figures

(1)

(2)

(3)

(1)

(2)

(3)

DESORPTION OF VOLATILE COMPOUNDS DISSOLVED IN A LIQUID PHASE

The present invention relates to a method of desorption of volatile compounds from an aqueous liquid containing ammonia, particularly (but not solely) for purifying waste water from a coke plant.

The treatment most widely used at present for purifying waste waters from coke plants comprises removal of volatile elements (such as $NH_3$, $HCN$, and $H_2S$) either by distillation or by stripping by live steam, and simultaneous lime or soda treatment to eliminate ammonia from fixed salts. The non-volatile elements are subsequently removed from the waters by biological oxidation in aeration tanks. Ammoniacal vapours are either destroyed in suitable incinerators with controlled formation of nitrogen oxides, or treated with sulphuric acid to produce ammonium sulphate.

Moreover, the desorption operation is known to be an important stage in the purification of waste waters from coke plants. A deficiency in this operation leads to well-known inconveniences, viz.

(a) overloading of the aeration tanks where the effectiveness of the treatment may be compromised by certain inhibition effects, (b) the need for additional treatment (such as activated carbon treatment) before discharging the waters to the environment, and (c) the risk of atmospheric pollution above the aeration tanks due to the evolution of residual volatile materials.

Accordingly, it is readily apparent that a desorption operation carrried out either by distillation or by stripping must be practically entirely completed to be fully effective.

The method according to the present invention is based in particular on the fact that it has been found that the free ammonia content in the waste waters from coke plants substantially varies with the pH of the waters, is practically nil at a pH equal to or lower than 7, and increases up to about 100% when the pH is 11.5.

The invention provides a method of desorption of volatile compounds from an aqueous liquid containing ammonia, by means of a stripping column, in which the aqueous liquid is supplied to the upper part of the column, a gaseous mixture including free oxygen is blown into the lower part of the column, sodium hydroxide and/or calcium hydroxide is supplied to an intermediate part of the column at a plurality of levels, a gaseous mixture including ammonia is withdrawn from the top of the column, the pH and the temperature of the aqueous liquid are measured at a plurality of levels in the column, and the flow rate of the aqueous liquid and the flow rate and temperature of the gaseous mixture blown in and of the hydroxide are controlled so that the pH of the aqueous liquid, at least in a predetermined zone of the column, is at least 11.

In a preferred method of purifying waste water from a coke plant, use is made of a stripping column in which a plurality of perforated plates are disposed substantially horizontally and spaced one above another, the waste water to be purified is supplied to the upper part of the column, while air or another gaseous mixture including free oxygen is blown in the lower part of the column, sodium hydroxide and/or calcium hydroxide is supplied to an intermediate part of the column at various levels, the gaseous mixture which has risen through the column and which includes ammonia liberated from the waste water is collected at the top of the column, the pH and the temperature of the water are measured at various levels, such as at the level of the plates, and the flow rate of the waste waters, the flow rate and temperature of the gaseous mixture blown in, and the flow rate and temperature of the basic hydroxide, are suitably adjusted so that the pH of the waste water, at least in a predetermined zone of the column, is at least 11 and preferably greater than 11.5.

The oxygen is used to completely burn the ammonia obtained from the waste water. Thus it is preferable for the amount of oxygen in the gaseous mixture blown in to be controlled so that, as a result of reaction of the ammonia with the oxygen, substantially only water and nitrogen are produced.

Preferably, the pH and temperature of the waste water are continuously measured automatically, e.g. by means of suitable detectors, and the flow rate of the waste water, the gaseous mixture blown in, and the basic hydroxide, as well as their temperature, are automatically controlled in accordance with the measurements.

The accompanying schematic drawings, given by way of non-limiting example and not to scale, illustrate an apparatus for carrying out the above described method according to the invention. In the drawings.

Figure 1:
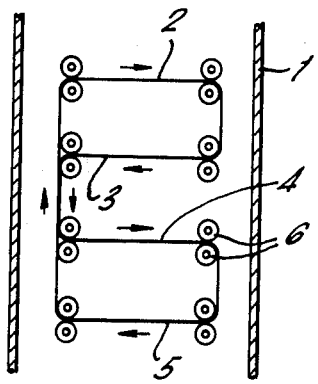
FIG. 1 shows three kinds of displacement of perforated belts.
Figure 1:
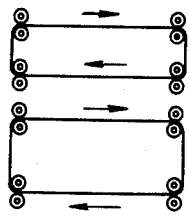
Figure 1:
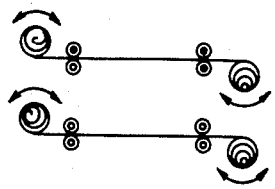

FIG. 1, variant No. 1, shows a vertical cross-sectional view of an arrangement of perforated belt portions. A vertical casing 1 houses a belt which has four horizontal levels 2, 3, 4, 5 on which desorption operations are carried out. The belt portions located at these four levels are connected to one another end-to-end so as to form a single endless belt which is displaced in the direction indicated by arrows in the drawing. The belt is driven along its complicated trajectory by means of pairs of fixed parallel rollers 6 which are rotated in the appropriate direction by a mechanism not shown in the drawings. It will be seen that, along its path, the belt is subjected to bending first in one direction and then in the other so that any kind of precipitate which would tend to stick to it is easily and automatically detached from it.

Variant No. 2 in FIG. 1 is an arrangement in which the four horizontal levels at which stripping takes place are provided by two distinct endless perforated belts which permanently move in the same direction and alternatively ascend and descend from one level to the other, and are driven by pairs of rollers similar to the rollers 6.

A third variant shown in FIG. 1 comprises two distinct perforated belts each of which supplies a respective stripping level by alternating movements in either direction. During such movements, the belt is unwound from one drum and extends to another drum on which it is wound and vice versa. Between these two drums, two pairs of horizontal rollers are located through which the said belt passes during its displacement. The belt portion extending between these two pairs of rollers actually constitutes the stripping plate at the level in question. Furthermore this variant is advantageous in that the belt is alternatively bent first in one direction and then in the other, which assists removal of any possible precipitate.

Figure 2:
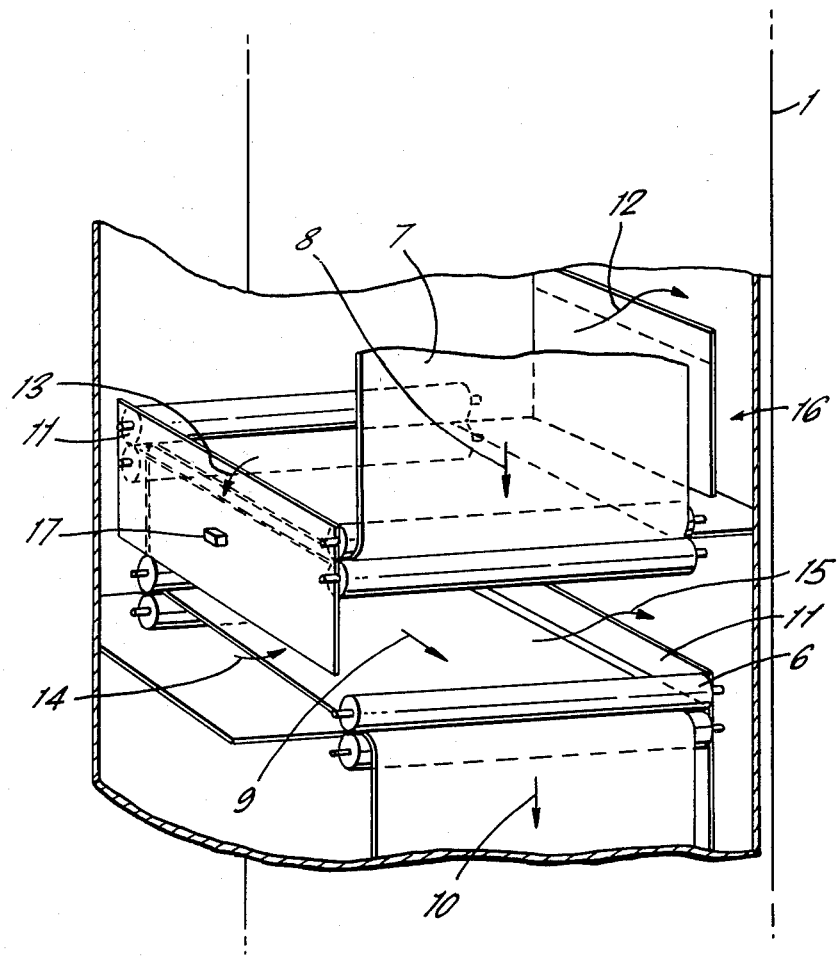
FIG. 2 shows details of a variant of the embodiment of FIG. 1.

FIG. 2 shows, as mentioned above, a detail of the apparatus shown in variant No. 1 of FIG. 1. It will be seen that the vertical casing 1 houses a belt 7, moving in one direction and then in another direction at different levels as indicated by arrows 8, 9, 10.

The liquid to be stripped (waste water from a coke plant) follows a descending path alternatingly extending, each time it passes above a plate (belt portion), from one side to the other of the said plate and vice versa. Liquid flows from any one plate to a lower plate when the liquid reaches a predetermined level above a given plate, the height of this level being controlled by means of a weir 11.

In a very schematic way, the path of the liquid is indicated by arrows 12 to 15 in FIG. 2. The belt 7 is tensioned and driven by means of pairs of rollers 6 disposed in the same way as in variant No. 1 shown in FIG. 1.

FIG. 2 also shows one of the places 16 where sodium hydroxide and/or calcium hydroxide can be injected, and one of the places 17 where the pH of the liquid is measured, preferably continuously.

I claim:

1. A method of desorption of volatile compounds from an aqueous liquid containing ammonia, by means of a stripping column, comprising the steps of supplying the aqueous liquid to the upper part of the column, blowing a gaseous mixture including free oxygen into the lower part of the column, supplying at least one of sodium hydroxide and calcium hydroxide to an intermediate part of the column at a plurality of levels, withdrawing a gaseous mixture including ammonia from the top of the column, measuring the pH and the temperature of the aqueous liquid at a plurality of levels in the column, controlling the flow rate of the aqueous liquid and the flow rate and temperature of the gaseous mixture blown in and of the hydroxide so that the pH of the aqueous liquid, at least in a predetermined zone in the column, is at least 11 and, subsequently reacting the ammonia content and oxygen content of the withdrawn gaseous mixture, the amount of oxygen in the gaseous mixture blown in being controlled so that substantially only water and nitrogen are produced.

2. A method as claimed in claim 1, in which the said pH is greater than 11.5.

3. A method as claimed in claim 1, in which the pH and temperature of the aqueous liquid in the column are continuously measured automatically and the said flow rates and temperatures are automatically adjusted in accordance with the measurements.

4. A method as claimed in claim 1, in which the column includes a plurality of perforated plates disposed substantially horizontal and spaced one above another.

5. A method as claimed in claim 4, in which the pH and temperature of the aqueous liquid are measured at the level of each plate.

6. A method as claimed in claim 1, in which the aqueous liquid comprises waste water from a coke plant.

* * * * *